(12) United States Patent
Nagamoto et al.

(10) Patent No.: US 7,751,175 B2
(45) Date of Patent: Jul. 6, 2010

(54) MULTILAYER CERAMIC CAPACITOR AND METHOD FOR MANUFACTURING THE SAME

(75) Inventors: Toshiki Nagamoto, Kusatsu (JP); Mitsuhiro Kusano, Omihachiman (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 12/537,661

(22) Filed: Aug. 7, 2009

(65) Prior Publication Data

US 2009/0290281 A1    Nov. 26, 2009

Related U.S. Application Data

(63) Continuation of application No. PCT/JP2008/052105, filed on Feb. 8, 2008.

(30) Foreign Application Priority Data

Feb. 14, 2007    (JP) ............... 2007-033151

(51) Int. Cl.
   *H01G 4/228*    (2006.01)
   *H01G 4/06*    (2006.01)

(52) U.S. Cl. ............ 361/306.3; 361/311; 361/303; 29/25.42

(58) Field of Classification Search ........... 361/303, 361/311, 306.1, 306.3, 309; 29/25.42
See application file for complete search history.

(56) References Cited

U.S. PATENT DOCUMENTS

| | | | | |
|---|---|---|---|---|
| 5,670,089 | A | * | 9/1997 | Oba et al. ............ 252/514 |
| 5,757,609 | A | * | 5/1998 | Yamana ............ 361/305 |
| 6,124,769 | A | | 9/2000 | Igarashi et al. |
| 6,461,540 | B2 | * | 10/2002 | Taira ............ 252/514 |
| 7,589,954 | B2 | * | 9/2009 | Kusano et al. ........ 361/321.4 |
| 2008/0046152 | A1 | | 2/2008 | Ohtake et al. |

FOREIGN PATENT DOCUMENTS

| | | | |
|---|---|---|---|
| JP | 2004228075 A | * | 8/2004 |
| WO | WO 2006 022258 | | 3/2006 |
| WO | WO 2006 090551 | | 8/2006 |

* cited by examiner

*Primary Examiner*—Eric Thomas
(74) *Attorney, Agent, or Firm*—Dickstein Shapiro LLP

(57) ABSTRACT

A multilayer ceramic capacitor having external electrodes. Each of the external electrodes has a lower layer resistance electrode and an upper layer conductive electrode. A glass contained in the upper layer conductive electrode has a softening point higher than that of a glass contained in the lower layer resistance electrode by 20° C. or more.

13 Claims, 2 Drawing Sheets

ND METHOD FOR MANUFACTURING THE SAME

MULTILAYER CERAMIC CAPACITOR AND METHOD FOR MANUFACTURING THE SAME

CROSS REFERENCE TO RELATED APPLICATIONS

The present application is a continuation of International Application No. PCT/JP2008/052105, filed Feb. 14, 2008, which claims priority to Japanese Patent Application No. JP2007-033151, filed Feb. 14, 2007, the entire contents of each of these applications being incorporated herein by reference in their entirety.

FIELD OF THE INVENTION

The present invention relates to a multilayer ceramic capacitor and a method for manufacturing the same, and more particularly relates to a multilayer ceramic capacitor which includes external electrodes each also functioning as a resistance element so as to be used as a CR composite electronic device and to a method for manufacturing the above multilayer ceramic capacitor.

BACKGROUND OF THE INVENTION

When a multilayer ceramic capacitor is used in the vicinity of a CPU for a decoupling application, since an equivalent series resistance (ESR) of the multilayer ceramic capacitor is excessively low, oscillation is generated on a circuit due to parallel resonance, and as a result, the impedance disadvantageously increases. Hence, as for multilayer ceramic capacitors used for the application described above, it has been desired to control the ESR within the range of several tens to several thousands of milliohms. As a technique to satisfy this desire, it has been proposed that a function as a resistance element is also imparted to external electrodes of a multilayer ceramic capacitor.

For example, in International Publication 2006/022258 pamphlet (Patent Document 1), a technique has been disclosed that in a multilayer ceramic capacitor including internal electrodes that contain Ni or a Ni alloy, external electrodes are each formed, for example, to have a two-layer structure in which a resistance electrode containing a glass component and a composite oxide (preferably an In—Sn composite oxide) that reacts with Ni or a Ni alloy is formed as a lower layer and in which a conductive electrode containing, for example, Cu or a Cu alloy as a primary component is formed as an upper layer.

In addition, the Patent Document 1 has disclosed that in order to control the ESR, the glass content and/or the glass softening point of the resistance electrode functioning as the lower layer of the external electrode is changed. In a particular embodiment described in the Patent Document 1, B—Si—Zn—Ba—Ca—Al-based glasses having softening points of approximately 560° C., approximately 580° C., and approximately 600° C. are used.

On the other hand, in the Patent Document 1, the glass contained in the conductive electrode functioning as the upper layer of the external electrode has not been specifically described.

In addition, in Japanese Unexamined Patent Application Publication No. 2004-128328 (Patent Document 2), a technique has been disclosed that in a multilayer ceramic capacitor including internal electrodes that contain Ni or the like, external electrodes are each formed, for example, to have a two-layer structure in which a resistance electrode containing a glass and a conductive material selected from ruthenium oxide, a ruthenium oxide compound, and graphite/carbon is formed as a lower layer, a conductive electrode containing a glass and a conductive material selected, for example, from Cu and Ni is formed as an upper layer, and the glass contained in the upper layer is the same as that contained in the lower layer.

When the multilayer ceramic capacitor as described above is manufactured, the lower layer resistance electrode and the upper layer conductive electrode of the external electrode are each formed by a firing step, and in order to obtain a stable ESR through the firing steps, the flow of glass from the upper layer conductive electrode into the lower layer resistance electrode or the flow of glass toward an interface portion therebetween must be suppressed.

However, for example, when the same glass as that in the lower layer resistance electrode is used in the upper layer conductive electrode, in the firing to form the upper layer conductive electrode, the flow of glass from the upper layer conductive electrode into the lower layer resistance electrode or toward the interface portion therebetween cannot be suppressed, and as a result, the resistance of the lower layer resistance electrode or the resistance of the interface portion may increase in some cases. As a result, the ESR may exceed an ESR value aimed only by the lower layer resistance electrode in some cases, and the control (adjustment) of the aimed ESR value is difficult to perform.

Patent Document 1: International Publication WO pamphlet

Patent Document 2: Japanese Unexamined Patent Application Publication No. 2004-128328

SUMMARY OF THE INVENTION

Accordingly, an object of the present invention is to provide a multilayer ceramic capacitor which can solve the problem described above and a method for manufacturing the above multilayer ceramic capacitor.

The present invention is first directed to a multilayer ceramic capacitor comprising a ceramic laminate including a plurality of ceramic layers laminated to each other, internal electrodes formed in the ceramic laminate, and external electrodes formed on outer surfaces of the ceramic laminate and electrically connected to specific internal electrodes, and the external electrodes each have a lower layer resistance electrode and an upper layer conductive electrode formed thereon. In order to solve the technical problem described above, the lower layer resistance electrode contains a first glass, the upper layer conductive electrode contains a second glass, and the second glass has a softening point higher than that of the first glass by 20° C. or more.

In the multilayer ceramic capacitor of the present invention, the second glass is preferably a glass which is crystallized in a firing step of forming the upper layer conductive electrode.

The present invention is also directed to a method for manufacturing a multilayer ceramic capacitor.

A method for manufacturing a multilayer ceramic capacitor of the present invention comprises a step of forming a ceramic laminate in which a plurality of ceramic layers is laminated to each other and in which internal electrodes are formed along specific interfaces between the ceramic layers, and a step of forming external electrodes on outer surfaces of the ceramic laminate so as to be electrically connected to specific internal electrodes.

The step of forming external electrodes described above includes a step of forming lower layer resistance electrodes containing a first glass by firing, and a step of forming upper layer conductive electrodes containing a second glass which has a softening point higher than that of the first glass by 20° C. or more on the lower layer resistance electrodes by firing. In this step, a firing temperature for forming the upper layer conductive electrodes is lower than that for forming the lower layer resistance electrodes.

In the method for manufacturing a multilayer ceramic capacitor of the present invention, the firing temperature for forming the upper layer conductive electrodes is preferably lower than that for forming the lower layer resistance electrodes by 10° C. or more, and the softening point of the second glass is preferably lower than the firing temperature for forming the upper layer conductive electrodes by 50° C. or more.

According to the present invention, since a glass having a softening point higher than that of the lower layer resistance electrode by 20° C. or more is used in the upper layer conductive electrode, in firing to form the upper layer conductive electrode, the flow of glass into the lower layer resistance electrode and toward an interface portion between the upper layer conductive electrode and the lower layer resistance electrode can be suppressed. As a result, an increase in resistance at the lower layer resistance electrode and that at the interface portion between the lower layer resistance electrode and the upper layer conductive electrode can be suppressed, and hence a stable aimed ESR value can be obtained.

In addition, since the softening point of the glass used in the upper layer conductive electrode is set higher, sealing properties of the upper layer conductive electrode against a plating liquid are improved, and the reliability of the multilayer ceramic capacitor can be improved. Furthermore, solder explosion (phenomenon in which as a plating liquid entering the electrode is gasified in soldering, a solder ball is splashed) can be made unlikely to occur. In particular, when the ratio of a glass network forming element, such as $SiO_2$, is increased in order to increase the softening point of the glass, the above sealing properties against a plating liquid can be further improved.

In the multilayer ceramic capacitor of the present invention, when the glass contained in the upper layer conductive electrode is a glass which is to be crystallized in a firing step of forming the upper layer conductive electrode, since the viscosity of the glass increases, and the flow thereof toward the lower layer resistance electrode side can be further suppressed, the aimed ESR value can be further stabilized.

According to the method for manufacturing a multilayer ceramic capacitor of the present invention, since the firing temperature for forming the upper layer conductive electrodes is lower than that for forming the lower layer resistance electrodes, a problem of bond break between the lower layer resistance electrode and the upper layer conductive electrode can be avoided.

In the method for manufacturing a multilayer ceramic capacitor of the present invention, when the firing temperature for forming the upper layer conductive electrodes is lower than that for forming the lower layer resistance electrodes by 10° C. or more, and when the softening point of the second glass contained in the upper layer conductive electrode is lower than the firing temperature for forming the upper layer conductive electrodes by 50° C. or more, the bond break between the lower layer resistance electrode and the upper layer conductive electrode can be more reliably avoided, and the upper layer conductive electrodes can be sufficiently sintered.

BRIEF DESCRIPTION OF THE DRAWINGS

FIGS. 2(a) and 2(b) are views showing a multilayer ceramic capacitor 21 according to another embodiment of the present invention, wherein FIG. 2(a) is an upper surface view of the multilayer ceramic capacitor 21, and FIG. 2(b) is a cross-sectional view taken along the line B-B of FIG. 2(a).

Figure 1:
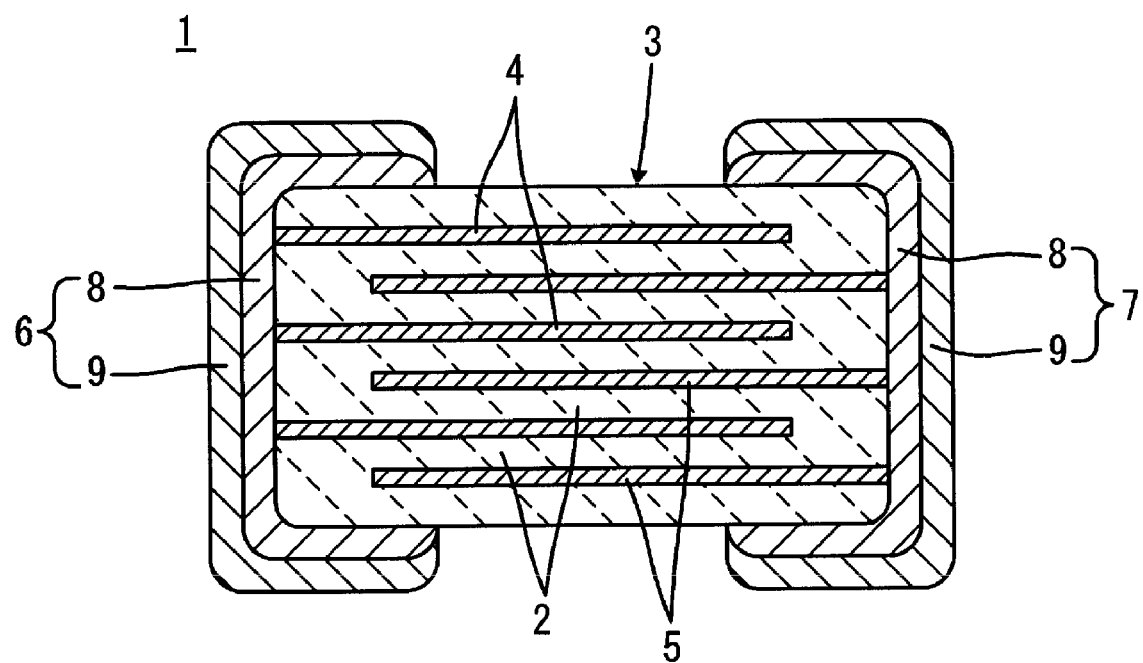
FIG. 1 is a front view schematically showing a multilayer ceramic capacitor 1 according to one embodiment of the present invention using a cross-sectional view facing in a lamination direction.

| Reference Numerals | |
|---|---|
| 1, 21 | multilayer ceramic capacitor |
| 2, 22 | ceramic layer |
| 3, 23 | ceramic laminate |
| 4, 5, 26, 27 | internal electrode |
| 6, 7, 28, 29 | external electrode |
| 8, 30 | lower layer resistance electrode |
| 9, 31 | upper layer conductive electrode |
| 24, 25 | via conductor |

DETAILED DESCRIPTION OF THE INVENTION

FIG. 1 shows a multilayer ceramic capacitor 1 according to one embodiment of the present invention.

The multilayer ceramic capacitor 1 has a rectangular parallelepiped ceramic laminate 3 formed by laminating a plurality of ceramic layers 2 each made of a dielectric ceramic. Internal electrodes 4 and 5 are formed inside the ceramic laminate 3 along specific interfaces between the ceramic layers 2. The internal electrodes 4 and 5 contain, for example, Ni or a Ni alloy as a conductive component. The internal electrodes 4 and the internal electrodes 5 are alternately disposed and face each other with the ceramic layers 2 interposed therebetween, so that an electrostatic capacitance is formed.

External electrodes 6 and 7 are formed on outer surfaces of the ceramic laminate 3 which are end portions facing each other. One external electrode 6 is electrically connected to the internal electrodes 4, and the other external electrode 7 is electrically connected to the internal electrodes 5.

In the multilayer ceramic capacitor 1 described above, the external electrodes 6 and 7 each have a lower layer resistance electrode 8 which is in contact with the outer surface of the ceramic laminate 3 and which is electrically connected to the internal electrodes 4 or 5 and an upper layer conductive electrode 9 formed on the lower layer resistance electrode 8.

The lower layer resistance electrodes 8 are electrodes to impart a function as a resistance element to the external electrodes 6 and 7 and preferably include a glass and an In—Sn composite oxide which reacts with Ni or a Ni alloy contained in the internal electrodes 4 and 5. The In—Sn composite oxide is generally synthesized by solid solving approximately 1 to 20 percent by weight of $SnO_2$ into $In_2O_3$ and is a conductive component having a predetermined resistance. The glass is an electrical insulating component, and for example, a B—Si—Zn—Ba—Ca-based glass is used as this glass; however, a glass having another composition system may be used instead.

The upper layer conductive electrode 9 contains a glass and a conductive metal. As the conductive metal, for example, Cu, a Cu alloy, Ag, a Ag alloy, Ni, and a Ni alloy may be used. In addition, as the glass mentioned above, for example, a B—Si—Zn—Ba—Ca-based glass is used; however, a glass having another composition system may be used instead.

The lower layer resistance electrode 8 is formed, for example, by applying a paste containing an In—Sn composite oxide powder, a glass frit, and an organic vehicle on the outer surfaces of the ceramic laminate 3, followed by firing. In addition, the upper layer conductive electrode 9 is formed, for example, by applying a paste containing a conductive metal powder, such as Cu or a Cu alloy, a glass frit, and an organic vehicle on the lower layer resistance electrode 8 so as to cover it, followed by firing.

In this step, when the glass contained in the lower layer resistance electrode 8 is called a first glass, and the glass contained in the upper layer conductive electrode 9 is called a second glass, the second glass is designed to have a softening point higher than that of the first glass by 20° C. or more. Accordingly, in the firing to form the upper layer conductive electrode 9, the second glass is suppressed from flowing into the lower layer resistance electrode 8 and toward an interface portion between the upper layer conductive electrode 9 and the lower layer resistance electrode 8. As a result, an unfavorable increase in resistance at the lower layer resistance electrode 8 and that at the interface portion can be suppressed, and hence a stable aimed ESR value can be obtained.

As described in this embodiment, when the lower layer resistance electrode 8 contains the In—Sn composite oxide and the first glass, it is particularly preferable when the softening point of the first glass is set in the range of 560 to 580° C. and when the softening point of the second glass is set in the range of 580 to 600° C. Accordingly, a more stable (that is, a less deviated) resistance can be obtained.

Although not shown in FIG. 1, whenever necessary, for example, a Sn or a solder plating film may be formed on the upper layer conductive electrode 9 in some cases. As described above, when the softening point of the second glass contained in the upper layer conductive electrode 9 is increased, sealing properties against a plating liquid used to form the plating film as described above can be improved. As a result, the reliability of the multilayer ceramic capacitor 1 thus obtained can be improved, and the solder explosion can be made unlikely to occur. In particular, in order to increase the softening point of the second glass, for example, when the ratio of a glass network forming element, such as $SiO_2$, is increased, the effect described above can be made more significant.

The firing temperature for forming the upper layer conductive electrodes 9 is preferably set lower than that for forming the lower layer resistance electrodes 8. The reason for this is that the advancement in densification of the lower layer resistance electrode 8 and the generation of change in condition, for example, of bonding properties with the internal electrodes 4 and 5, both of which may occur in the firing to form the upper layer conductive electrodes 9, can be suppressed, and a more stable ESR can be obtained. Accordingly, the bond break between the lower layer resistance electrode 8 and the upper layer conductive electrode 9 can be avoided. In order to surely avoid this bond break problem, the firing temperature for forming the upper layer conductive electrodes 9 is set lower than that for forming the lower layer resistance electrodes 8 by 10° C. or more. In addition, in order to sufficiently sinter the upper layer conductive electrode 9, the softening point of the second glass is preferably set lower than the firing temperature for forming the upper layer conductive electrodes 9 by 50° C. or more.

Although the present invention has been described with reference to the embodiment shown in the figure, various changes and modifications may be made within the scope of the present invention.

For example, as for each of the external electrodes 6 and 7, a conductive layer in contact with the ceramic laminate 3 and the internal electrodes 4 or 5 may be further formed, and the lower layer resistance electrode 8 may be formed in contact with the outer surface of this conductive layer. The conductive layer preferably contains a metal as a primary component which reacts with the metal contained in the internal electrodes 4 and 5. When the internal electrodes 4 and 5 contain, for example, Ni or a Ni alloy, as the metal contained in the conductive layer as a primary component, Ni and/or Cu is preferably used.

In addition, although FIG. 1 is a schematic front view showing the multilayer ceramic capacitor 1 using a cross-sectional view facing in a lamination direction, when the ceramic laminate 3 is viewed in a planar direction, it is not clear in FIG. 1 whether the external electrodes 6 and 7 are formed at the short sides or the long sides of the ceramic laminate 3. The present invention may be applied to the case in which the external electrodes 6 and 7 are formed at the short sides of the ceramic laminate 3 and may also be applied to the case in which the external electrodes 6 and 7 are formed at the long sides of the ceramic laminate 3.

Figure 2A:
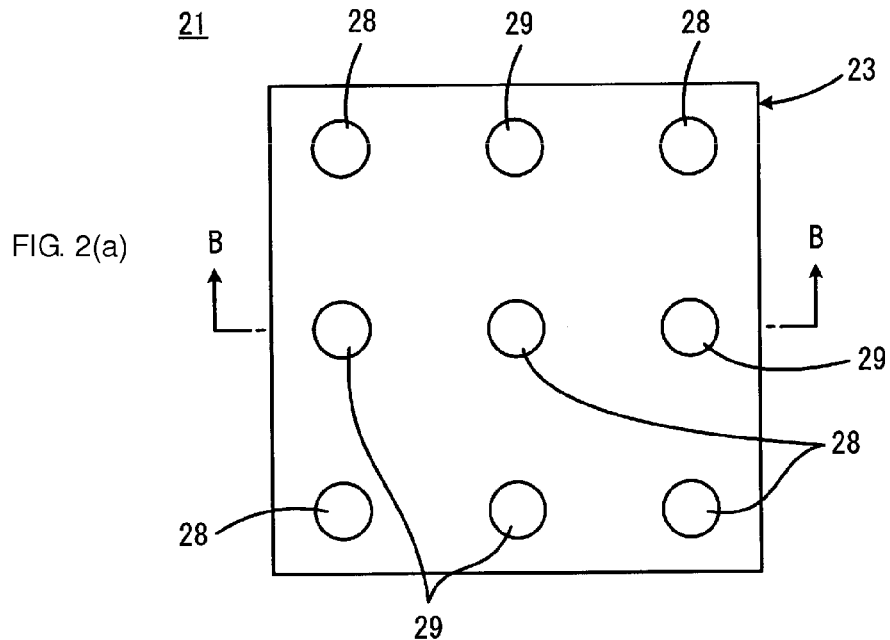
Figure 2B:
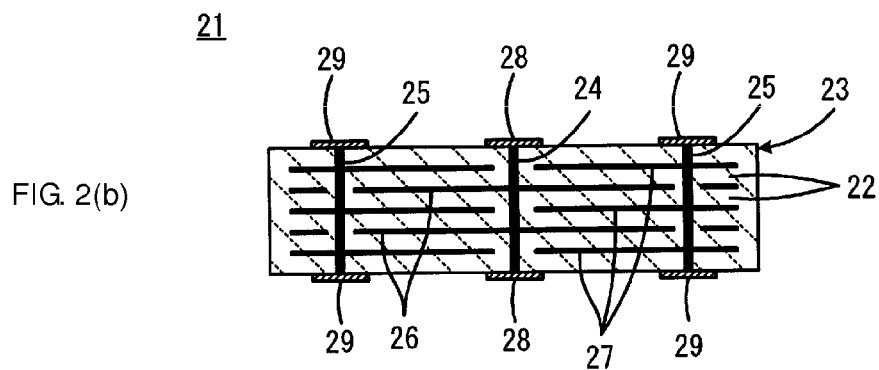
Figure 3:
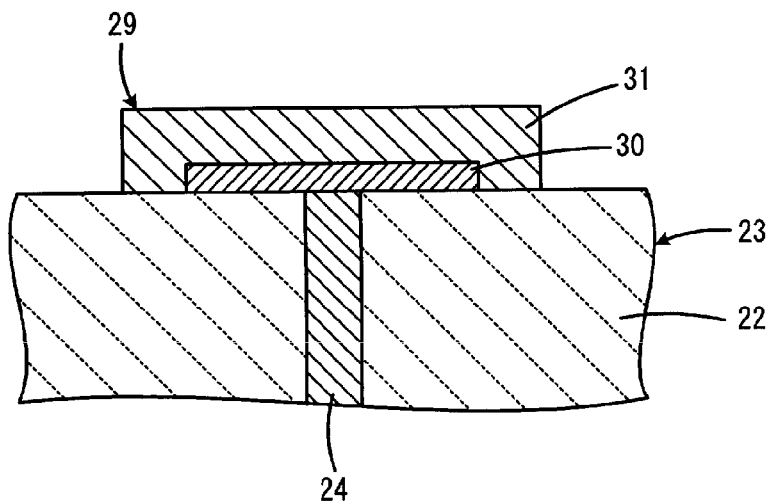
FIG. 3 is an enlarged view of a part shown in FIG. 2(b).

In addition, the present invention may be applied to a via array type multilayer ceramic capacitor. FIGS. 2(a), 2(b) and 3 each show a via array type multilayer ceramic capacitor 21 according to another embodiment of the present invention. FIG. 2(a) is an upper surface view of the multilayer ceramic capacitor 21, and FIG. 2(b) is a cross-sectional view taken along the line B-B shown in FIG. 2(a). FIG. 3 is an enlarged view of a part shown in FIG. 2(b).

The multilayer ceramic capacitor 21 has a rectangular parallelepiped shape, in more particular, a square prism shape ceramic laminate 23 formed by laminating a plurality of ceramic layers 22 of a dielectric ceramic. Inside the ceramic laminate 23, there are formed first and second via conductors 24 and 25 which penetrate the ceramic laminate 23 in the lamination direction and which extend to the upper and the lower surfaces thereof and first and second internal electrodes 26 and 27 which are formed along specific interfaces between the ceramic layers 22.

The first internal electrodes 26 and the second internal electrodes 27 are alternately disposed and face each other with the ceramic layers 22 interposed therebetween, so that an electrostatic capacitance is formed. The first via conductor 24 is electrically connected to the first internal electrodes 26 but is electrically insulated from the second internal electrodes 27. On the other hand, the second via conductor 25 is electrically connected to the second internal electrodes 27 but is electrically insulated from the first internal electrodes 26.

The via conductors 24 and 25 and the internal electrodes 26 and 27 contain Ni or a Ni alloy as a conductive component.

A plurality of first external electrodes 28 and a plurality of second external electrodes 29 are formed on the upper and the lower surfaces of the ceramic laminate 23. The first external electrode 28 is electrically connected to the first via conductor 24, and the second external electrode 29 is electrically connected to the second via conductor 25. As a result, the first external electrode 28 is electrically connected to the first internal electrodes 26, and the second external electrode 29 is electrically connected to the second internal electrodes 27. As clearly shown in FIGS. 2(a) and 2(b), the first external electrodes 28 and the second external electrodes 29 are disposed adjacent to each other on the upper and the lower surfaces of the ceramic laminate 23.

In the via array type multilayer ceramic capacitor 21 as described above, as shown in FIG. 3 of the first external electrode 28, the external electrodes 28 and 29 each have a lower layer resistance electrode 30 in contact with the ceramic laminate 23 and also in contact with the via conductor 24 or 25 and an upper layer conductive electrode 31 formed on the lower layer resistance electrode 30.

The lower layer resistance electrode 30 has a composition similar to that of the lower layer resistance electrode 8 shown in FIG. 1. The upper layer conductive electrode 31 has a composition similar to that of the upper layer conductive electrode 9 shown in FIG. 1.

The via array type multilayer ceramic capacitor 21 described above can be manufactured as described below.

First, ceramic green sheets to be formed into the ceramic layers 22 are prepared, and a conductive paste forming the via conductors 24 and 25 and the internal electrodes 26 and 27 is also prepared.

Next, the conductive paste is printed on the ceramic green sheets by screen printing or the like, so that conductive paste films to be formed into the internal electrodes 26 and 27 are formed.

Next, after a predetermined number of ceramic green sheets provided with the conductive paste films by printing are laminated to form a laminate, a predetermined number of ceramic green sheets for an external layer provided with no conductive paste films are laminated on one side of the laminate, and whenever necessary, ceramic green sheets for an external layer are also laminated on the other side of the laminate, so that a green laminate in a mother state is formed. Whenever necessary, this mother laminate is pressure bonded in the lamination direction by a method such as hydrostatic pressing.

Next, by using a measure, such as laser or NC punching, penetrating holes penetrating through the laminate in the lamination direction are formed. In addition, by a method, such as screen printing, a conductive paste to be formed into the via conductors 24 and 25 are filled in the above penetrating holes.

Subsequently, the green mother laminate obtained through the steps described above is cut into the green ceramic laminate 23 in a green state having a predetermined size, and this ceramic laminate 23 in a green state is fired.

After the firing, by a method such as screen printing, a paste for the lower layer resistance electrode 30 is printed on the upper and the lower surfaces of the ceramic laminate 23 so as to cover the exposed via conductors 24 and 25, followed by firing, so that the lower layer resistance electrodes 30 functioning as underlayers of the external electrodes 28 and 29 are formed.

Subsequently, by a method such as screen printing, a paste for the upper layer conductive electrode 31 is printed on the lower layer resistance electrodes 30, followed by firing, so that the upper layer conductive electrodes 31 are formed. Next, whenever necessary, plating may be performed on the upper layer conductive electrodes 31.

Next, experimental examples carried out to confirm the effect of the present invention will be described.

Experimental Example 1

First, by a known method, a ceramic laminate for a multilayer ceramic capacitor was prepared which was designed to contain Ni in internal electrodes and to obtain an electrostatic capacitance of 1 µF.

In addition, a paste for lower layer resistance electrodes was prepared as described below.

After an $In_2O_3$ powder and a $SnO_2$ powder were mixed together so that the content of the $SnO_2$ powder to the total amount of the $In_2O_3$ powder and the $SnO_2$ powder was 5 percent by weight and were then calcined in the air at a temperature of 1,400° C. for 5 hours so that $SnO_2$ was sufficiently solid-solved, a pulverizing treatment was performed until a powder having an average particle diameter of approximately 1 µm was obtained, so that an In—Sn composite oxide powder was obtained.

In addition, as a first glass, a glass frit composed of a B—Si—Zn—Ba—Ca-based glass, having a softening point shown in "First Glass Softening Point" in Table 1, and having an average particle diameter of approximately 1 µm was prepared. In this experimental example, the softening point is a temperature obtained by visual reading from an inflection point which indicates a softening point of a differential thermal analyzer (DTA).

Next, an organic vehicle containing 20 percent by weight of an acrylic resin was added to and mixed with the In—Sn composite oxide powder and the glass frit prepared as described above, followed by performing a roll dispersion treatment, so that the paste for lower layer resistance electrodes was obtained. In this paste, the volume ratio of (In—Sn composite oxide powder):(glass frit):(organic vehicle) was set to 1:1:8.

In addition, a paste for upper layer conductive electrodes was formed as described below.

A Cu powder was prepared by blending a spherical powder having an average particle diameter of 1 µm and a spherical powder having an average particle diameter of 0.5 µm at a ratio of 50:50.

In addition, as a second glass, a glass frit containing a B—Si—Zn—Ba—Ca-based glass as primary elements, having a softening point shown in "Second Glass Softening Point" in Table 1, and having an average particle diameter of approximately 1 µm was prepared.

Next, an organic vehicle containing 20 percent by weight of an acrylic resin was added to and mixed with the Cu powder and the glass frit prepared as described above, followed by performing a roll dispersion treatment, so that the paste for upper layer resistance electrodes was obtained. In this paste, the volume ratio of (Cu powder):(glass frit):(organic vehicle) was set to 20:5:75.

Next, the paste for lower layer resistance electrodes was applied to respective end portions of the ceramic laminate thus prepared by a dipping method and was then dried at a temperature of 150° C. for 10 minutes. After this drying, the coating thickness was approximately 30 µm.

Subsequently, the ceramic laminate provided with the paste for lower layer resistance electrodes and dried as described above was allowed to pass through a continuous belt furnace and was fired in a $N_2$ atmosphere (oxygen concentration: 10 ppm or less) at a maximum temperature shown in "Firing Temperature of Lower Layer Resistance Electrode" in Table 1 for 15 minutes, so that the lower layer resistance electrodes were formed. In addition, the firing temperature for forming the lower layer resistance electrodes was set to a temperature at which the ESR had a minimum value and was stabilized.

Next, the paste for upper layer conductive electrodes was applied on the lower layer resistance electrodes by a dipping method and was dried at a temperature of 150° C. for minutes. After this drying, the coating thickness was approximately 50 μm.

Subsequently, the ceramic laminate provided with the paste for upper layer resistance electrodes and dried as described above was allowed to pass through a continuous belt furnace and was fired in a $N_2+H_2O$ atmosphere (oxygen concentration: 10 ppm or less, $H_2O=0.5$ cc/$N_2=100$ L) at a maximum temperature shown in "Firing Temperature of Upper Layer Resistance Electrode" in Table 1 for 15 minutes, so that the upper layer resistance electrodes were formed. In addition, the firing temperature for forming the upper layer resistance electrodes was set to a minimum temperature at which the denseness (sealing properties against a plating liquid) of the electrode could be ensured.

Next, by a process in which each sample thus obtained was immersed in a coupling agent and was then cured by a heat treatment, hydrophobic properties were imparted to the sample, and subsequently, Ni plating and Sn plating were performed in accordance with a known electrolytic barrel plating method, so that a multilayer ceramic capacitor having a size of 0.8 μm×1.6 μm was obtained from each sample.

The ESR value of the multilayer ceramic capacitor thus obtained from each sample was measured. The results are shown in Table 1. In Table 1, the rate of change in ESR is also shown. The rate of change in ESR was the ratio of ESR (R1) measured by applying an In—Ga alloy on the lower layer resistance electrodes before the upper layer conductive electrodes were formed to ESR (R2) measured after the upper layer conductive electrodes were formed and was obtained from the following equation, $\{(R2-R1)/R1\}\times100(\%)$.

As can be seen from Table 1, first, according to Samples 1, 2, 7, and 8 in which as the second glass, a glass having a softening point equivalent to or lower than that of the first glass is used, the rate of change in ESR is high, such as 20% or more, and the control of ESR is difficult to perform.

In addition, according to Samples 3 and 9 in which the second glass has a softening point higher than that of the first glass but the softening point of the second glass is higher than that of the first glass only by 10° C., the rate of change in ESR is 10% or more although being lower than that of Samples 1, 2, 7, and 8.

On the other hand, according to Samples 4 to 6 and 10 to 12 in which the second glass has a softening point higher than that of the first glass by 20° C. or more, the rate of change in ESR is significantly low, and the control of ESR can be easily performed.

Experimental Example 2

In Experimental Example 2, after multilayer ceramic capacitors of Samples 13 and 14 were formed as shown in Table 2 under conditions similar to those of Samples 4 and 10, respectively, of Experimental Example 1 except that as the second glass contained in the upper layer conductive electrode, a glass was used which was crystallized in a firing step of forming the upper layer conductive electrodes, evaluation similar to that in Experimental Example 1 was performed.

TABLE 1

| Sample No. | Softening Point of First Glass | Firing Temperature of Lower Layer Resistance Electrode | Softening Point of Second Glass | Firing Temperature of Upper Layer Conductive Electrode | ESR Value | Rate of Change in ESR |
|---|---|---|---|---|---|---|
| 1* | 560° C. | 720° C. | 540° C. | 630° C. | 200 mΩ | +33% |
| 2* | 560° C. | 720° C. | 560° C. | 650° C. | 185 mΩ | +23% |
| 3* | 560° C. | 720° C. | 570° C. | 660° C. | 171 mΩ | +14% |
| 4  | 560° C. | 720° C. | 580° C. | 670° C. | 155 mΩ | +3% |
| 5  | 560° C. | 720° C. | 600° C. | 680° C. | 150 mΩ | +0% |
| 6  | 560° C. | 720° C. | 640° C. | 710° C. | 152 mΩ | +1% |
| 7* | 620° C. | 780° C. | 600° C. | 680° C. | 292 mΩ | +27% |
| 8* | 620° C. | 780° C. | 620° C. | 700° C. | 276 mΩ | +20% |
| 9* | 620° C. | 780° C. | 630° C. | 710° C. | 253 mΩ | +10% |
| 10 | 620° C. | 780° C. | 640° C. | 710° C. | 237 mΩ | +3% |
| 11 | 620° C. | 780° C. | 660° C. | 730° C. | 232 mΩ | +1% |
| 12 | 620° C. | 780° C. | 700° C. | 760° C. | 232 mΩ | +1% |

In Table 1, Sample Nos. provided with * indicate comparative examples which are out of the range of the present invention.

The evaluation results are shown in Table 2. In addition, in Table 2, the crystallization start temperature of the second glass of each of Samples 13 and 14 are also shown.

TABLE 2

| Sample No. | Softening Point of First Glass | Firing Temperature of Lower Layer Resistance Electrode | Softening Point of Second Glass | Crystallization Start Temperature of Second Glass | Firing Temperature of Upper Layer Conductive Electrode | ESR Value | Rate of Change in ESR |
|---|---|---|---|---|---|---|---|
| 4  | 560° C. | 720° C. | 580° C. | —       | 670° C. | 155 mΩ | +3% |
| 13 | 560° C. | 720° C. | 580° C. | 650° C. | 670° C. | 151 mΩ | +0% |
| 10 | 620° C. | 780° C. | 640° C. | —       | 710° C. | 237 mΩ | +3% |
| 14 | 620° C. | 780° C. | 640° C. | 690° C. | 710° C. | 231 mΩ | +0% |

As can be seen from Table 2, according to Samples 13 and 14 in which as the second glass, a glass which is crystallized in a firing step of forming the upper layer conductive electrodes is used, the rates of change in ESR of Samples 13 and 14 can be further decreased as compared to that of Samples 4 to 10, respectively. The reason for this is that since the second glass is crystallized at a firing temperature for forming the upper layer conductive electrodes, the viscosity of the glass increases, and hence the flow of the glass to the lower layer resistance electrode side is further suppressed.

The invention claimed is:

1. A multilayer ceramic capacitor comprising:
   a ceramic laminate;
   a plurality of internal electrodes in the ceramic laminate; and
   external electrodes formed on at least one outer surface of the ceramic laminate, the external electrodes being electrically connected to different respective internal electrodes of the plurality of internal electrodes,
   wherein the external electrodes each have a lower layer resistance electrode and an upper layer conductive electrode on the lower layer resistance electrode, and
   the lower layer resistance electrode contains a first glass, the upper layer conductive electrode contains a second glass, the second glass having a softening point higher than a softening point of the first glass by 20° C. or more.

2. The multilayer ceramic capacitor according to claim 1, wherein the lower layer resistance electrode further contains an In—Sn composite oxide.

3. The multilayer ceramic capacitor according to claim 1, wherein the first glass is a B—Si—Zn—Ba—Ca-based glass.

4. The multilayer ceramic capacitor according to claim 1, wherein the upper layer conductive electrode further contains a conductive metal.

5. The multilayer ceramic capacitor according to claim 1, wherein the second glass is a B—Si—Zn—Ba—Ca-based glass.

6. The multilayer ceramic capacitor according to claim 1, wherein the softening point of the first glass is in a range of 560 to 580° C.

7. The multilayer ceramic capacitor according to claim 6, wherein the softening point of the second glass is in a range of 580 to 600° C.

8. The multilayer ceramic capacitor according to claim 1, wherein the softening point of the second glass is lower than a firing temperature for forming the upper layer conductive electrode by 50° C. or more.

9. The multilayer ceramic capacitor according to claim 1, wherein the second glass is a glass which is crystallized when forming the upper layer conductive electrode.

10. A method for manufacturing a multilayer ceramic capacitor, the method comprising:
    forming a ceramic laminate in which a plurality of ceramic layers are laminated to each other and in which a plurality of internal electrodes are formed along specific interfaces between the plurality of ceramic layers; and
    forming external electrodes on at least one outer surface of the ceramic laminate so as to be electrically connected to different respective internal electrodes of the plurality of internal electrodes,
    wherein the step of forming the external electrodes includes:
      forming lower layer resistance electrodes containing a first glass by firing; and
      forming upper layer conductive electrodes containing a second glass on the lower layer resistance electrodes by firing,
    the second glass having a softening point higher than a softening point of the first glass by 20° C. or more, and
    a firing temperature for forming the upper layer conductive electrodes is lower than a firing temperature for forming the lower layer resistance electrodes.

11. The method for manufacturing a multilayer ceramic capacitor according to claim 10, wherein the firing temperature for forming the upper layer conductive electrodes is lower than the firing temperature for forming the lower layer resistance electrodes by 10° C. or more.

12. The method for manufacturing a multilayer ceramic capacitor according to claim 10, wherein the softening point of the second glass is lower than the firing temperature for forming the upper layer conductive electrodes by 50° C. or more.

13. The method for manufacturing a multilayer ceramic capacitor according to claim 10, wherein the forming of the upper layer conductive electrodes is carried out such that the second glass is crystallized.

* * * * *